United States Patent
Kuckelkorn et al.

(10) Patent No.: US 7,013,887 B2
(45) Date of Patent: Mar. 21, 2006

(54) ABSORBER PIPE FOR SOLAR HEATING APPLICATIONS

(75) Inventors: Thomas Kuckelkorn, Weiden (DE); Fritz-Dieter Doenitz, Schirmitz (DE); Nikolaus Benz, Weiden (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 10/615,146

(22) Filed: Jul. 8, 2003

(65) Prior Publication Data

US 2004/0050381 A1 Mar. 18, 2004

(30) Foreign Application Priority Data

Jul. 8, 2002 (DE) ................................ 102 31 467

(51) Int. Cl.
*F24J 2/24* (2006.01)
*F24J 3/02* (2006.01)
*F16L 27/12* (2006.01)

(52) U.S. Cl. ...................... 126/652; 126/653; 126/654; 126/655; 126/656; 126/657; 285/145.5

(58) Field of Classification Search ................ 126/625, 126/653, 654, 655, 656, 657, 704, 705, 708, 126/712, 714, 652; 285/187, 300, 301, 145.5
See application file for complete search history.

(56) References Cited

U.S. PATENT DOCUMENTS

| | | | |
|---|---|---|---|
| 1,292,466 A | | 1/1919 | Hills |
| 1,293,441 A | | 2/1919 | Houskeeper |
| 1,946,184 A | * | 2/1934 | Abbot .......................... 126/603 |
| 4,133,298 A | * | 1/1979 | Hayama ...................... 126/591 |
| 4,173,968 A | * | 11/1979 | Steward ....................... 126/654 |
| 4,186,725 A | * | 2/1980 | Schwartz ..................... 126/694 |
| 4,231,353 A | | 11/1980 | Kanatani et al. |
| 4,326,503 A | * | 4/1982 | Geier et al. .................. 126/655 |
| 4,372,291 A | * | 2/1983 | Schwartz ..................... 126/655 |
| 4,523,578 A | * | 6/1985 | Mahdjuri Sabet ........... 126/677 |
| 6,324,870 B1 | | 12/2001 | Chabin et al. |

FOREIGN PATENT DOCUMENTS

| | | |
|---|---|---|
| DE | 28 27 082 | 3/1979 |
| DE | 89 13 387.0 | 3/1990 |
| DE | 100 36 746 A1 | 1/2002 |
| FR | 2470939 * | 6/1981 |

(Continued)

OTHER PUBLICATIONS

Hank Price et al: "Advances in Parabolic Tuogh Solar Power Technology", Journal of Solar Energy Engineering, May 2002, vol. 124, pp. 109-125.

*Primary Examiner*—Carl D. Price
(74) *Attorney, Agent, or Firm*—Michael J. Striker

(57) ABSTRACT

The absorber pipe (1), especially for a parabolic collector for a solar heat collecting apparatus, is described. The absorber pipe (1) includes central metal pipe (3), a glass sleeve tube (2) surrounding the nine so that an annular space (4) is formed between them and an expansion compensating device connecting the central metal nine and a glass-metal transitional element (5) on a free end of the sleeve tube (2). The expansion compensation device (10) connects the metal pipe and sleeve tube, so that they can slide relative to each other, and includes folding bellows (11) for that purpose. Furthermore it also includes a connecting element (15), which has either a cylindrical or a conical section (17,18, 18") and which connects an interior end of the folding bellows with the metal pipe.

27 Claims, 4 Drawing Sheets

| | FOREIGN PATENT DOCUMENTS | | |
|---|---|---|---|
| GB | 2032095 | * | 4/1980 |
| JP | 55-14455 | * | 1/1980 |
| JP | 55-14456 | * | 1/1980 |
| JP | 56-77646 | * | 6/1981 |
| JP | 56-82350 | * | 7/1981 |
| JP | 57-9554 | * | 6/1982 |
| JP | 58-55645 | * | 4/1983 |
| JP | 58-99648 | * | 6/1983 |
| JP | 58-205049 | * | 11/1983 |
| JP | 59-119137 | * | 7/1984 |

* cited by examiner

ABSORBER PIPE FOR SOLAR HEATING APPLICATIONS

BACKGROUND OF THE INVENTION

1. Field of the Invention

The present invention relates to an absorber pipe, especially for a parabolic collector in a solar heat collecting apparatus, which comprises a central metal pipe, a glass sleeve tube surrounding the central metal pipe to form an annular space between it and the central metal pipe, and a glass-metal transitional element arranged on a free end of the glass sleeve tube, wherein the central metal pipe and the glass-metal transitional element are connected with each other by means of at least one expansion compensating device so that they can move relative to each other in a longitudinal direction. The invention also relates to a parabolic collector using the absorber pipe and to the use of the absorber pipe.

2. Description of the Related Art

Parabolic collectors are described, for example, in "Journal of Solar Energy Engineering", Vol. 124, p. 109 f, May 2002.

The glass-metal connection is characterized by a direct bonding of materials without additional use of adhesives (metal with glass or glass solder-low-melting glass). The boundary surface contact is achieved by pre-oxidation of the metal. The glass thus forms a permanent chemical bond with the metal oxide. Conducting the process with pretreatment and melting is decisive for quality.

Glass-metal transitional elements are described in, e.g., U.S. Pat. No. 1,292,466, U.S. Pat. No. 1,293,441 or U.S. Pat. No. 6,324,870 B1. This sort of glass-metal transitional element has a tapering metal end section, which is surrounded by a glass body, and usually has large linear thermal expansion differences between the glass and metal. The length difference is absorbed in the very thin metal.

In the so-called fitted glass-metal transitional element, like those e.g. in X-ray tubes, the expansion coefficients for the glass and metal are equal in size. Also this transitional element achieves a good bond by pre-oxidation.

The glass-metal transitional elements can be glass-sealed directly or connected by glass solder.

The absorber pipe usually comprises an inner radiation-absorbing coated steel pipe and a surrounding glass tubular sleeve. The individual absorber pipes are about 4 m long and are assembled to form a solar field loop with a length of up to 800 m. The solar radiation is concentrated on the pipe by a mirror arranged behind the pipe. A glass-metal transitional member connects the glass tube and metal pipe with each other in a gas-tight manner. The intervening space between the metal pipe and the glass tube is evacuated to minimize the heat loss and to raise the energy yield. Expansion compensation is required between the metal pipe and tubular glass sleeve, because of the different thermal expansion coefficients of metal and glass and because of the great difference in heating in operation in which the metal pipe reaches about 400° C. and the glass tube only 100° C. This expansion compensation is generally provided by a metal folding bellows, as described in "Journal of Solar Energy Engineering", May 2002, Vol 124, p. 109 and following, page 115.

In the currently known structures the glass-metal transitional element and the folding bellows are arranged linearly next to each other. This has the result that a significant part of the pipe surface of about 2 to 3% cannot be used as a collecting surface for the solar radiation. This leads to a reduction in the optical efficiency.

The solar radiation reaching the pipe directly makes the protection of the thermally stressed glass-metal transitional element from heat required.

Additional screens provide this protection, however they do not sufficiently screen off the radiation reaching the sleeve tube in slanting light, which enters the sleeve tube and is unsuitable for the absorber. Because of that a breakdown of the glass-metal connection occurs on the north side of the absorber pipe. The result is loss of vacuum and because of that the efficiency of the absorber tube is limited. The exchange of individual absorber tubes is extremely expensive because the entire solar field loop must be idled or put out of operation for that reason. Usually these features are avoided and an overall power reduction from the entire solar field is accepted by running the absorber pipe with a rate of more than 2% per year.

Different solutions with a sliding bearing between the glass tube and the sleeve tube are currently proposed to reduce the shadow effect and to maximize the aperture surface.

A compensating device is known from DE 100 36 746 A1, which has an axially slidable sealing device, which is attached to one of the pipes, while the other pipe is slidable axially on the sealing device. The sealing device, for example, can be shrunk on the metal pipe and can be slidable relative to the tubular glass sleeve.

The other sealing device according to DE 100 36 746 A1, which is arranged on the pipe ends, has a circular groove for receiving an end of the sleeve tube so that it is sealed in the circular groove. The sealing device is held fixed on the central pipe in this case. A chamber, which is bounded by the sealing device and this end of the tubular sleeve, is provided in the circular groove. This chamber is designed for receiving a liquid acted on with pressure. This arrangement is expensive and does not operate reliably, so that loss of vacuum after a short time must be considered. However if no vacuum is present, the absorbing coating degrades at high temperature under normal atmospheric pressure substantially more rapidly than under vacuum.

A warm water pipe collector is known from U.S. Pat. No. 4,231,353, which is provided only for operating temperatures of 70° C. A metal plate, which is glued to the front face of the tubular glass sleeve by an adhesive, is arranged between the tubular glass sleeve and the central metal pipe. This arrangement has no glass-metal transitional element. The expansion compensation device, which guarantees a larger shift or displacement of the pipes in the longitudinal direction relative to each other, is not present. In all cases the cover provided with a circular bead can take small length differences, however undesirable radial forces are exerted on the glass edge. This collector pipe is thus basically unsuitable for use in a parabolic collector.

SUMMARY OF THE INVENTION

It is an object of the present invention to provide an absorber pipe of the above-described kind, especially for a parabolic collector, which has a greater service life than absorber pipes of the prior art.

It is another object of the invention to provide a parabolic collector, which has a greater service life than those of the prior art and which uses the absorber pipe according to the invention.

These objects are attained in an absorber pipe, which comprises a central metal pipe, a glass sleeve tube surrounding the central metal pipe to form an annular space between it and the central metal pipe, and a glass-metal transitional element arranged on a free end of the glass sleeve tube, wherein the central metal pipe and the glass-metal transitional element are connected with each other by at least one expansion compensating device, so that they move relative to each other in a longitudinal direction.

These objects are attained with an absorber pipe, whose expansion compensation device is arranged under a glass-to-metal transitional element (5) attached to the sleeve tube (2) and at least partially within the annular space between the metal pipe and the glass-metal transitional element.

Because of that the expansion compensation device takes on two functions. First the expansion compensation between the metal pipe and tubular glass sleeve is guaranteed and at the same time radiation is kept from the glass-metal transitional element by the expansion compensation device. Thus no overheating can occur in this region and the vacuum-tight seal between the metal pipe and the sleeve tube is not damaged.

Because the expansion compensation device is not arranged beside the glass-metal transitional element in an axial direction but under the glass-metal transitional element inside the absorber pipe, the structure is considerably shortened and at the same time the screened off surfaces of the absorber pipe are reduced, which is accompanied by an increase in efficiency of the absorber pipe. Because of that a compact component group comprising the expansion compensation device and the glass-metal transitional element is formed, which guarantees a vacuum-tight seal in a simple way and additional components, such as an interior screen, can be eliminated.

An additional advantage is that the glass-metal transitional element is protected by the interior expansion compensation device from radiation, which would reach the transition region after entering the tubular sleeve. Since current heating and breakage of the glass-metal transition element by radiation is the principal cause for breakdown of the absorber pipe, the service life would be clearly increased by the arrangement according to the invention. The heat losses in the end region of the absorber pipe are reduced by the double vacuum insulation. The double vacuum insulation results because the connecting element to the metal pipe already provides insulation. Also a circular air space toward the outside between the connecting element and the folding bellows and a second vacuum insulation between the folding bellows and the glass occurs. Because of the narrow gap size between the sleeve tube and the folding bellows, no air exchange occurs so that the insulation layer sequence vacuum-air-vacuum is effective. The expansion compensation device is not directly irradiated by the hot interior tube, which leads to a smaller load on the glass-metal transitional element.

The expansion compensation device preferably has a folding bellows, which extends in the longitudinal direction along the absorber pipe.

The active surface of the absorber pipe is increased by insertion of the folding bellows into the interior of the absorber pipe. This leads to a higher energy output.

According to a first embodiment the inner end of the folding bellows is connected by a connecting element with the metal pipe. The outer end of the folding bellows is connected by the glass-metal transitional element with the tubular sleeve. The inner end is the end, which points into the circular space, while the outer end either is outside of the circular space or points toward the outside of the circular space. The connecting element is preferably sealed in a gas-tight manner with the metal pipe. In this embodiment the glass-metal transitional element has an inward directed collar, to which the outer end of the folding bellows is attached.

In order to increase the efficiency of the absorber pipe, the connecting element extends from the inner end of the folding bellows through a first circular space between the following bellows and the metal pipe. A connecting element formed in this way provides the possibility that the efficiency of the absorber pipe can be increased, especially with flat incident radiation falling back on the absorbing element.

The connecting element preferably extends up to the vicinity of the outer end of the folding bellows. The more the connecting element extends into the first circular space to the opposite end of the folding bellows, the greater is the output or efficiency.

In a preferred embodiment of the invention the connecting element preferably has a circular disk attached to the folding bellows, which goes over into a conical pipe-like section extending through the first circular space. The conical form is especially advantageous for reflection of flat incident radiation at the metal pipe and is employed where a minimum spacing between the folding bellows and the metal pipe must be maintained because of deformations in operation. Also a cylindrical embodiment is possible when a folding bellows with a small diameter is used so that only a smaller first circular space is available.

To further increase the efficiency or output, the connecting element is provided with a mirror surface at least partially covering a side facing the metal pipe.

According to an additional embodiment a connecting element and a glass-metal transitional element connect the inner end of the folding bellows with the tubular sleeve. The outer end of the folding bellows is attached to the metal pipe. The connecting element and the folding bellows are located between the glass-metal transitional element and the metal pipe in this embodiment.

Preferably the connecting element extends from the inner end of the folding bellows through a second circular space between the folding bellows and the tubular sleeve. Thus the connecting element can extend beyond the outer end of the folding bellows toward the outside. However a shorter version can also be provided so that the outer end of the folding bellows protrudes against the connecting element.

The connecting element preferably has a circular disk attached to the folding bellows, which goes over into a pipe-like cylindrical section extending through the second circular space at its outer end.

The glass-metal transitional element is attached to an outer collar formed on the connecting element.

The folding bellows is provided with a mirror surface at least partially covering its side facing the metal pipe, so that the folding bellows can be used for back reflection of flat radiation in this embodiment. The output of the absorber pipe thus is increased.

An expansion compensation device is preferably arranged at both ends of the absorber pipe.

The circular space between the sleeve tube and the metal pipe is evacuated or filled with noble gas according to an additional embodiment of the invention.

A parabolic collector has a longitudinal linear parabolic reflector with a linear focal line and at least one absorber pipe according to the invention with the above-described features arranged along its focal line. The absorber pipe must be maintained at a parabolic collector temperature of about 400° C. during use. The absorber pipe is very suitable for this purpose because of its construction.

BRIEF DESCRIPTION OF THE DRAWING

The objects, features and advantages of the invention will now be described in more detail with the aid of the following description of the preferred embodiments, with reference to the accompanying figures in which.

DETAILED DESCRIPTION OF THE INVENTION

Figure 1:
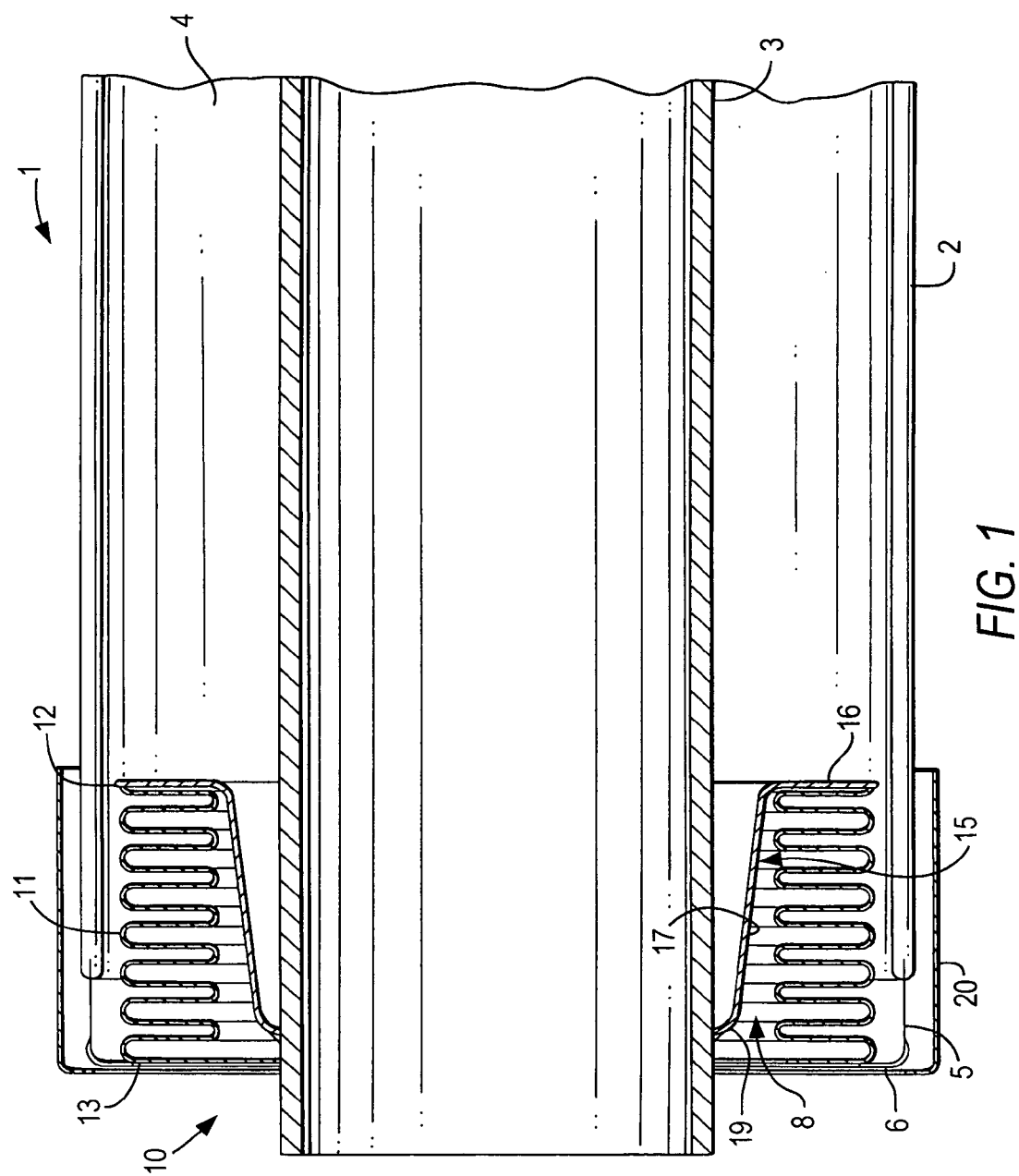
FIG. 1 is a partial longitudinal cross-sectional view through an absorber pipe according to a first embodiment of the invention.

A longitudinal cross-sectional view through an end of the absorber pipe 1 is shown in FIG. 1. The absorber pipe 1 has a glass sleeve tube 2 and a central metal pipe 3 arranged concentrically in the glass sleeve tube 2. A radiation-selective coating for absorption of the solar radiation is provided on the outside of the metal pipe 3.

A glass-metal transitional element 5 is attached on the free front end of the sleeve tube 2. The glass-metal transitional element 5 has a radially inwardly pointing collar 6. The expansion compensation device 10 in the form of a folding bellows 11 is arranged in an annular space 4 between the sleeve tube 2 and the metal pipe 3. The outer end 13 of the folding bellows 11 is attached to the collar 6 of the glass-metal transitional element 5.

The folding bellows 11 extends adjacent the glass-metal transitional element 5 and into the annular space 4. The inner end 12 of the folding bellows 11, which is opposite from the outer end 13, is attached to a connecting element 15, which has a circular disk 16 for this purpose. This circular disk 16 goes or changes over into a conical section 17 at its inner edge, which extends into a first circular space 8 between the folding bellows 11 and the metal pipe 3.

The connecting element 15 has an attaching collar 19 at its opposite end, with which the connecting element 15 is attached to the metal pipe 3, preferably by soldering.

The form of the conical section 17 has the advantage that incident radiation falling directly on it is reflected to the absorber pipe 3. Thus the efficiency is increased. The end of the absorber pipe 3 is also covered by a protective tube 20, whose axial length corresponds approximately to the length of the folding bellows. The protective tube 20 can be kept on the sleeve tube 2 or the glass-metal transitional element 5 and prevents direct irradiation of the folding bellows 11.

The glass-metal transitional element 5 is thus screened off by the protective tube 20 and the folding bellows 11 as well as by the connector 15, so that no heating occurs. Thus no damage of this element occurs.

Figure 2:
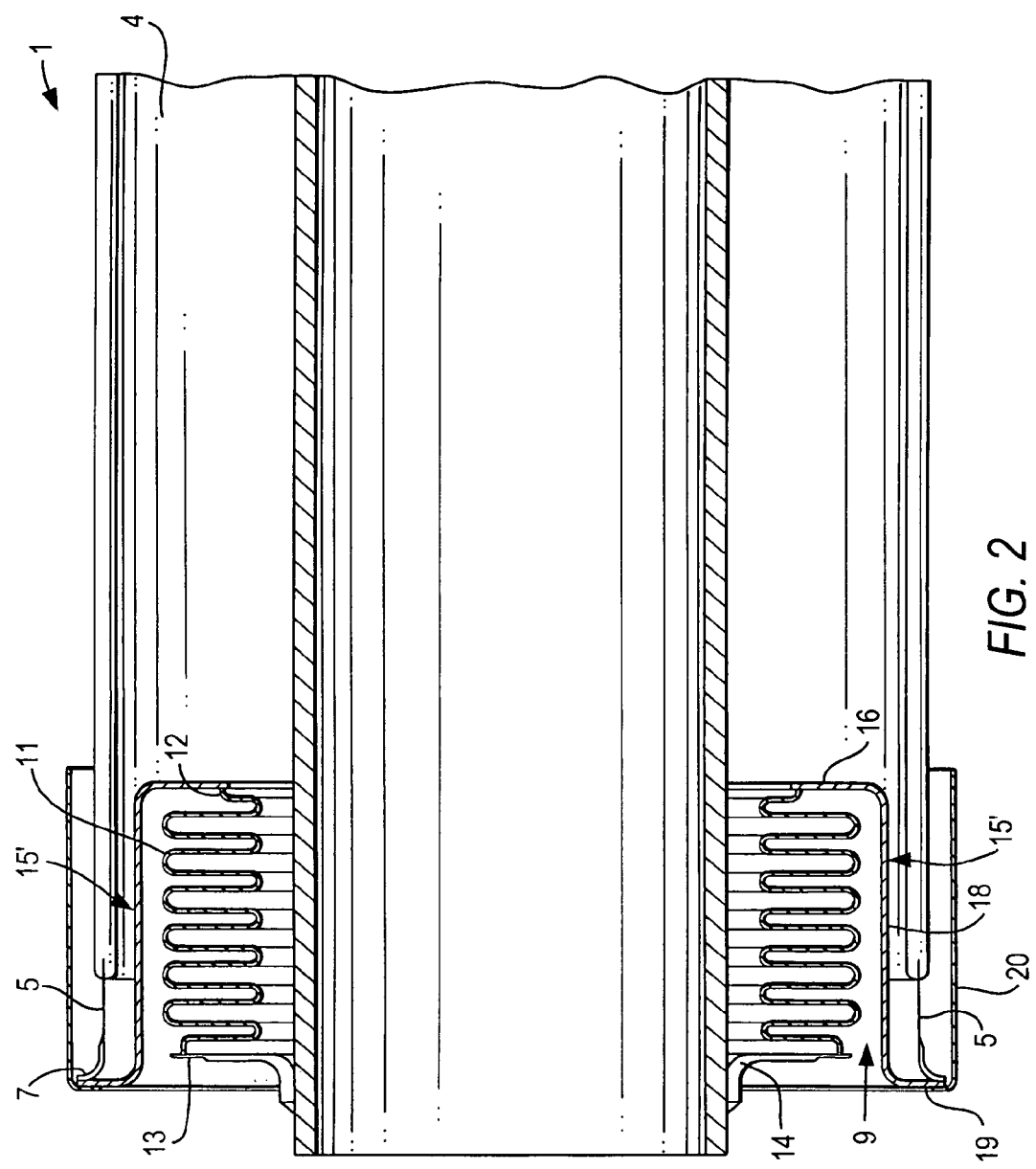
FIG. 2 is a partial longitudinal cross-sectional view through an absorber pipe according to a second embodiment of the invention.

In FIG. 2 an additional embodiment is illustrated, in which the folding bellows 11 is similarly arranged in the annular space 4 between the sleeve tube 2 and the metal pipe 3. The sleeve tube 2 has a glass-metal transitional element 5 with a radially outwardly directed collar 7, to which the attaching collar 19 of the connecting element 15' is attached. The connecting element 15' extends through the second circular space 9, which is formed between the folding bellows 11 and the sleeve tube 2 and/or the glass-metal transitional element 5. Since a reflection does not occur in this region, the central section of the connecting element is formed as a cylindrical section 18, which goes over at its interior end into the circular disk 16, which is attached to the folding bellows 11. The outer end 13 of the bellows 11 is connected to the central metal pipe 3 by means of fastening element 14 in the embodiment shown in FIG. 2. In this case the interior of the folding bellows 11 is provided at least partially with a mirror surface.

Figure 3:
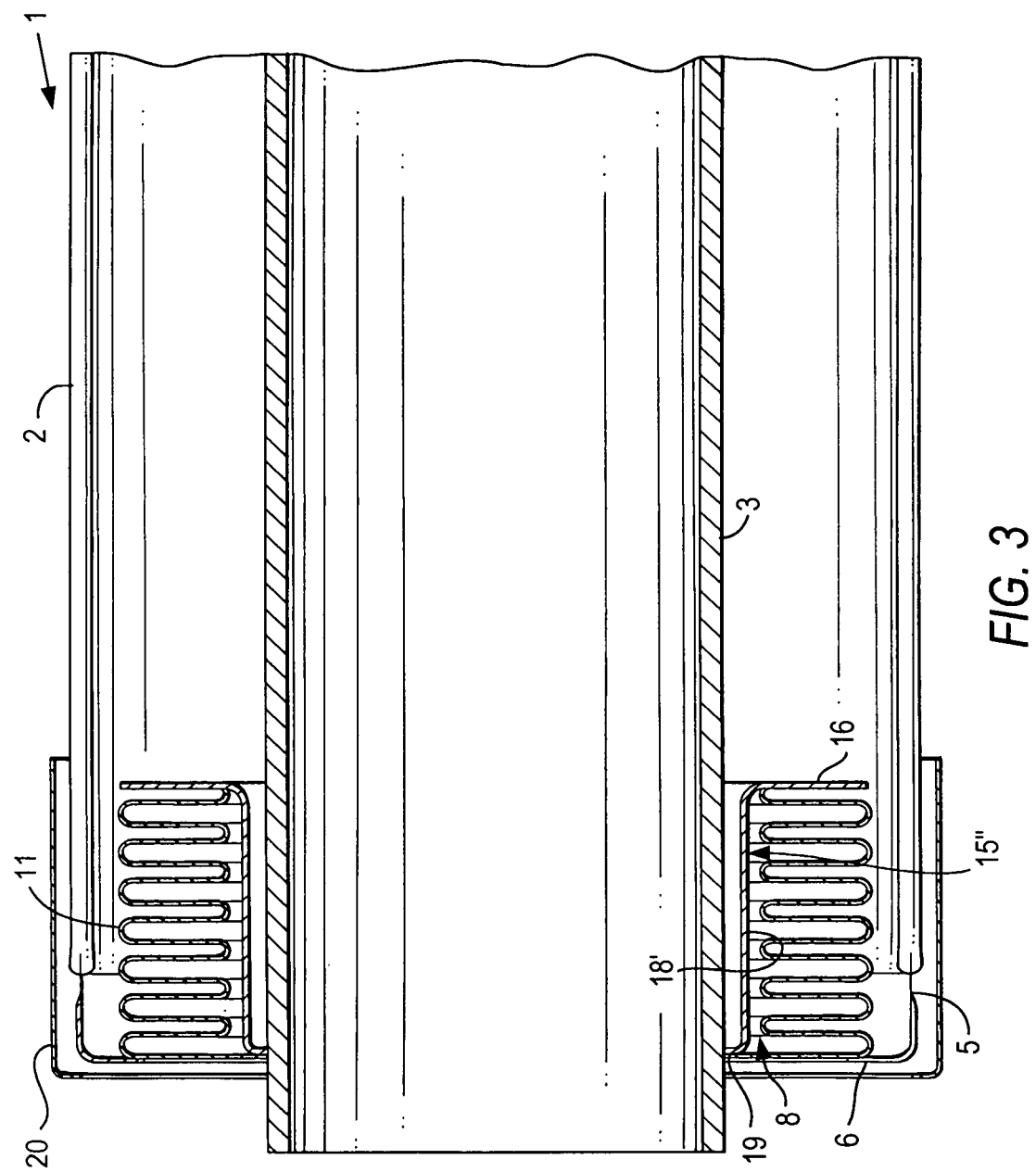
FIG. 3 is a partial longitudinal cross-sectional view through an absorber pipe according to a third embodiment of the invention.

In FIG. 3 an additional embodiment is shown based on the principles of the embodiment shown in FIG. 1. The diameter of the folding bellows 11 is less so that the annular space 4 is smaller. For these reasons the connecting element 15" has a cylindrical section 18'.

Figure 4:
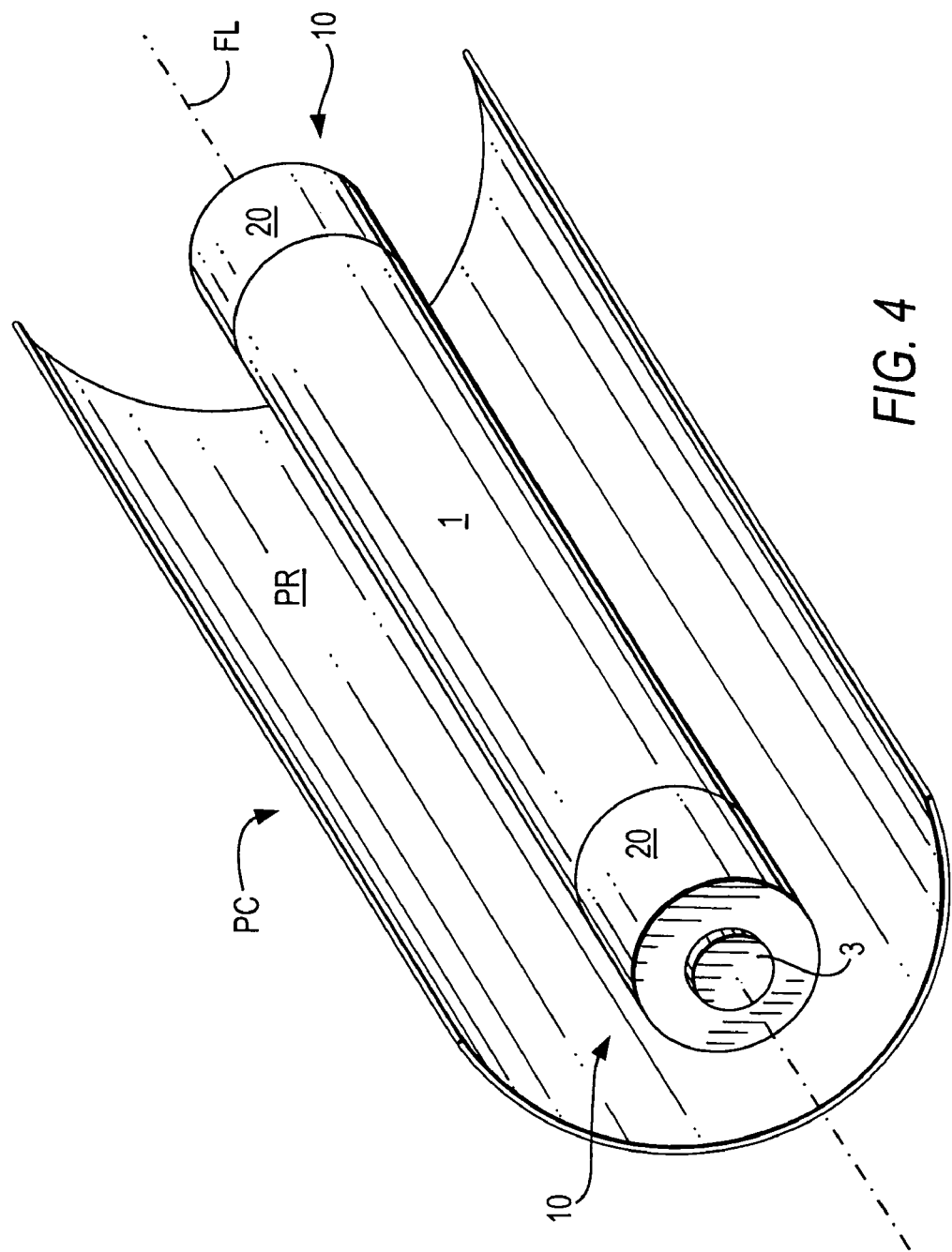
FIG. 4 is a perspective view of a parabolic reflector including an absorber pipe in accordance with the present invention.

The parabolic collector PC according to the invention is shown in FIG. 4. The parabolic collector comprises a longitudinally extending linear parabolic reflector PR having a focal line FL and an absorber pipe 1. The ends of the absorber pipe 1 are each covered by the protective tube 20, which was described in the foregoing. An expansion compensating device 10, which was also described above, is arranged under each protective tube 20.

The disclosure in German Patent Application 102 31 467.5-16 of Jul. 8, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in an absorber pipe for solar heating applications, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. An absorber pipe, especially for a parabolic collector in a solar heat collecting apparatus, said absorber pipe comprising
   a central metal pipe (3);
   a glass sleeve tube (2) surrounding said central metal pipe (3) so that an annular space (4) is formed between the central metal pipe and the glass sleeve tube (2);
   a glass-metal transitional element (5) on a free end of the glass sleeve tube; and
   an expansion compensating device (10) connecting the central metal pipe and the glass-metal transitional element (5) with each other so as to be slidable relative to each other in a longitudinal direction and to guarantee a vacuum-tight seal between the free end of the glass sleeve tube and the central metal pipe;
   wherein said expansion compensating device (10) comprises a folding bellows (11) and a connecting element (15, 15', 15"), said folding bellows (11) is arranged between the glass-metal transitional element (5) and the central metal pipe (3), said folding bellows (11) extends into said annular space (4), said folding bellows (11) has an outer end (13) and an inner end (12), said inner end (12) is arranged within the annular space (4), said outer end (13) is arranged outside of the annular space, and said inner end (12) of said folding bellows (11) is connected to one end of said connecting element (15, 15', 15");

wherein another end of said connecting element (15, 15', 15") opposite to the one end connected to the folding bellows (11) is either connected to the central metal pipe (3) or to the glass-metal transitional element (5); and wherein said folding bellows (11) and said connecting element (15, 15', 15") extend sufficiently into the annular space (4) and between the grass sleeve tube (2) and the central metal pipe (3), so that said glass-metal transitional element (5) is protected from radiation which would otherwise reach the glass-metal transitional element (5) after entering the glass sleeve tube (2);

wherein said glass-metal transitional element comprises a metal section glass-sealed directly within said free end of the glass sleeve tube.

2. The absorber pipe as defined in claim 1, wherein the outer end (13) of the folding bellows (11) is connected with the glass sleeve tube (2) by the glass-metal transitional element (5).

3. The absorber pipe as defined in claim 2, wherein the connecting element (15, 15") extends from said inner end (12) of the folding bellows (11) through a first circular space (8) formed between the folding bellows (11) and the central metal pipe (3).

4. The absorber pipe as defined in claim 3, wherein the connecting element (15, 15") has a circular disk (16) attached to the folding bellows (11) and said circular disk (16) goes over into a conical or cylindrical pipe-shaped section (17, 18') extending Through the first circular space (5).

5. The absorber pipe as defined in claim 3, wherein the connecting element (15, 15") is provided at least partially with a mirror surface on a side facing said central metal pipe (3).

6. The absorber pipe as defined in claim 1, wherein the inner end (12) of the folding bellows (11) is connected with the glass sleeve tube (2) by the connecting element (15') and by the glass-metal transitional element (5).

7. The absorber pipe as defined in claim 6, wherein the connecting element (15') extends from said inner end of the folding bellows (11) Through a second circular space (9) formed between the folding bellows (11) and the sleeve babe (2).

8. The absorber pipe as defined in claim 7, wherein said connecting element (15') comprises a circular disk (16) attached to said folding bellows (11) and said circular disk (18) goes over into a pipe-shaped cylindrical section (18) extending through said second circular space (9).

9. The absorber pipe as defined in claim 6, wherein said glass-metal transitional element (5) is attached to an outer collar (19) formed on said connecting element (15').

10. The absorber pipe as defined in claim 6, wherein the connecting element (15') is provided at least partially with a mirror surface on a side facing said central metal pipe (3).

11. The absorber pipe as defined in claim 1, further comprising another glass-metal transitional element (5) arranged on another end of the glass sleeve tube (2) opposite from the free end of the glass sleeve tube (2) and another expansion compensating device (10) connecting the central metal pipe and said another glass-metal transitional element (5) with each other, so as to be slidable relative to each other in a longitudinal direction and to guarantee a vacuum-tight seal between said another end of the glass sleeve tube and the central metal pipe.

12. The absorber pipe as defined in claim 1, wherein said annular space (4) is evacuated.

13. The absorber pipe as defined in claim 1, wherein said annular space (4) is filled with a noble gas.

14. A parabolic collector for a solar heat collecting apparatus, said parabolic collector comprising a longitudinally extending linear parabolic reflector (PR) having a focal line (FL) and at least one absorber pipe (1) arranged along said focal line;

wherein said at least one absorber pipe (1) comprises a central metal pipe (3), a glass sleeve tube (2) surrounding said central metal pipe (3) so that an annular space (4) is formed between the central metal pipe and the glass sleeve tube (2), a glass-metal transitional element (5) on a free end of the glass sleeve tube and an expansion compensating device (10) connecting the central metal pipe and the glass-metal transitional element (5) with each other so as to be slidable relative to each other in a longitudinal direction and to guarantee a vacuum-tight seal between the free end of the glass sleeve tube and the central metal pipe;

wherein said expansion compensating device (10) comprises a folding bellows (11) and a connecting element (15, 15', 15"), said folding bellows (11) is arranged between the glass-metal transitional element (5) and the central metal pipe (3), said folding bellows (11) extends into said annular space (4), said folding bellows (11) has an outer end (13) and an inner end (12), said inner end (12) is arranged within the annular space (4), said outer end (13) is arranged outside of the annular space, and said inner end (12) of said folding bellows (11) is connected to one end of said connecting element (15, 15', 15");

wherein another end of said connecting element (15, 15', 15") opposite to the one end connected to the folding bellows (11) is either connected to the central metal pipe (3) or to the glass-metal transitional element (5); and wherein said folding bellows (11) and said connecting element (15, 15', 15") extend sufficiently into the annular space (4) and between the glass sleeve tube (2) and the central metal pipe (3), so that Said glass-metal transitional element (5) is protected from radiation which would otherwise reach the glass-metal transitional element (5) after entering the glass sleeve tube (2);

wherein said glass-metal transitional element comprises a metal section glass-sealed directly within said free end of the glass sleeve tube.

15. The parabolic collector as defined in claim 14, wherein the outer end (13) of the folding bellows (11) is connected with the glass sleeve tube (2) by the glass-metal transitional element (5).

16. The parabolic collector as defined in claim 15, wherein the connecting element (15, 15") extends from said inner end (12) of the folding bellows (11) through a first circular space (8) formed between the folding bellows (11) and the central metal pipe (3).

17. The parabolic collector as defined in claim 16, wherein the connecting element (15, 15") has a circular disk (16) attached to the folding bellows (11) and said circular disk (16) goes over into a conical or cylindrical pipe-shaped section (17, 18') extending through the first circular space (5).

18. The parabolic collector as defined in claim 16, wherein the connecting element (15, 15") is provided at least partially with a mirror surface on a side facing said central metal pipe (3).

19. The parabolic collector as defined in claim 14, wherein the inner end (12) of the folding bellows (11) is connected with the glass sleeve tube (2) by the connecting element (15') and the glass-metal transitional element (5).

20. The parabolic collector as defined in claim 19, wherein the connecting element (15') extends from said inner end of the folding bellows (11) through a second circular space (9) formed between the folding bellows (11) and the sleeve tube (2).

21. The parabolic collector as defined in claim 20, wherein said connecting element (15') has a circular disk (16) attached to said folding bellows (11) and said circular disk (16) goes over into a pipe-shaped cylindrical section (18) extending through said second circular space (9).

22. The parabolic collector as defined in claim 19, wherein said glass-metal transitional element (5) is attached to an outer collar (19) formed on said connecting element (15').

23. The parabolic collector as defined in claim 19, wherein the connecting element (15') is provided at least partially with a mirror surface on a side facing said central metal pipe (3).

24. The parabolic collector as defined in claim 14, wherein the at least one absorber tube includes another glass-metal transitional element (5) arranged on another end of the glass sleeve tube (2) opposite from the free end of the glass sleeve tube (2) and another expansion compensating device (10) connecting the central metal pipe and said another glass-metal transitional element (5) with each other, so as to be slidable relative to each other in a longitudinal direction and to guarantee a vacuum-tight seal between said another end of the glass sleeve tube and the central metal pipe.

25. The absorber pipe as defined in claim 14, wherein said annular space (4) is evacuated.

26. The absorber pipe as defined in claim 14, wherein said annular space (4) is filled with a noble gas.

27. An absorber pipe, especially for a parabolic collector in a solar heat collecting apparatus, said absorber pipe comprising a central metal pipe (3);

a glass sleeve tube (2) surrounding said central metal pipe (3) so that an annular space (4) is formed between the central metal pipe and the glass sleeve tube (2);

a glass-metal transitional element (5) on a free end of the glass sleeve tube; and an expansion compensating device (10) connecting the central metal pipe and the glass-metal transitional element (5) with each other so as to be slidable relative to each other in a longitudinal direction and to guarantee a vacuum-tight seal between the free end of the glass sleeve tube and the central metal pipe;

wherein said expansion compensating device (10) comprises a folding bellows (11) and a connecting element (15, 15', 15"), said folding bellows (11) is arranged between the glass-metal transitional element (5) and the central metal pipe (3), said folding bellows (11) extends in the longitudinal direction into said annular space (4), said folding bellows (11) has an outer end (13) and an inner end (12), said inner end (12) is arranged within the annular space (4), said outer end (13 arranged outside of the annular space, and said inner end (12) of said folding bellows (11) is connected to one end of said connecting element (15, 15', 15");

wherein another end of said connecting element (15, 15', 15") opposite to the one end connected to the folding bellows (11) is either connected to the central metal pipe (3) or to the glass-metal transitional element (5);

wherein said connecting element (15, 15', 15") elmer extends in the longitudinal direction between the bellows (11) and the central metal pipe (3) or between the bellows (11) and the glass sleeve tube (2); and wherein said folding bellows (11) and said connecting element (15, 15', 15") extend sufficiently into the annular space (4) and between the glass sleeve tube (2) and the central metal pipe (3), so that said glass-metal transitional element (5) is protected from radiation which would otherwise reach the glass-metal transitional element (5) after entering the glass sleeve tube (2);

wherein said glass-metal transitional element comprises a metal section glass-sealed directly within said free end of the glass sleeve tube.

\* \* \* \* \*